US008204878B2

(12) United States Patent
Amer-Yahia et al.

(10) Patent No.: US 8,204,878 B2
(45) Date of Patent: Jun. 19, 2012

(54) SYSTEM AND METHOD FOR FINDING UNEXPECTED, BUT RELEVANT CONTENT IN AN INFORMATION RETRIEVAL SYSTEM

(75) Inventors: Sihem Amer-Yahia, New York, NY (US); Sergei Vassilvitskii, New York, NY (US); Cong Yu, Hoboken, NJ (US)

(73) Assignee: Yahoo! Inc., Sunnyvale, CA (US)

( * ) Notice: Subject to any disclaimer, the term of this patent is extended or adjusted under 35 U.S.C. 154(b) by 234 days.

(21) Appl. No.: 12/688,364

(22) Filed: Jan. 15, 2010

(65) Prior Publication Data
US 2011/0179019 A1 Jul. 21, 2011

(51) Int. Cl.
*G06F 17/30* (2006.01)
(52) U.S. Cl. ........................ 707/723; 707/732
(58) Field of Classification Search ............. 707/5, 732, 707/722, 749, 733, 748, 769, 3; 706/11
See application file for complete search history.

(56) References Cited

U.S. PATENT DOCUMENTS

| | | | | |
|---|---|---|---|---|
| 7,734,632 B2* | 6/2010 | Wang | | 707/749 |
| 7,860,811 B2* | 12/2010 | Flinn et al. | | 706/11 |
| 7,949,659 B2* | 5/2011 | Chakrabarti et al. | | 707/732 |
| 7,974,983 B2* | 7/2011 | Goeldi | | 707/769 |
| 7,987,182 B2* | 7/2011 | Slothouber et al. | | 707/722 |
| 2007/0244862 A1* | 10/2007 | Adams et al. | | 707/3 |
| 2008/0109426 A1* | 5/2008 | Constantinides | | 707/5 |
| 2009/0006368 A1* | 1/2009 | Mei et al. | | 707/5 |
| 2009/0006371 A1* | 1/2009 | Denoue et al. | | 707/5 |
| 2009/0307215 A1* | 12/2009 | Ball et al. | | 707/5 |
| 2010/0106730 A1* | 4/2010 | Aminian et al. | | 707/748 |
| 2010/0211575 A1* | 8/2010 | Collins et al. | | 707/749 |
| 2010/0306249 A1* | 12/2010 | Hill et al. | | 707/769 |
| 2011/0252031 A1* | 10/2011 | Blumenthal et al. | | 707/733 |

* cited by examiner

*Primary Examiner* — James Trujillo
*Assistant Examiner* — Thong Vu
(74) *Attorney, Agent, or Firm* — James J. DeCarlo; Greenberg Traurig, LLP

(57) ABSTRACT

An improved method for information retrieval in web query and recommendation systems, where items that are likely unfamiliar to the users of the system, but potentially relevant, are recommended. In a recommendation system having ratings by a plurality of users for a plurality of items, items are assigned to one or more data regions based on item attributes or user activity. Source regions are identified for each of the data regions. For a given user, data regions with which both the user and the user's social network are unfamiliar are identified. Within a given data region, the relevance of items to the user within such regions is evaluated using ratings provided by other users who have entered ratings similar to the user in source regions for the data region. Items receiving the highest relevance score are recommended to the user.

34 Claims, 3 Drawing Sheets

SYSTEM AND METHOD FOR FINDING UNEXPECTED, BUT RELEVANT CONTENT IN AN INFORMATION RETRIEVAL SYSTEM

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for improving the relevance of the results returned by web-based query or recommendation systems and, more particularly, to systems and methods for improving the relevance of the results returned by such systems by identifying items that are outside of users' experience, but of potential interest.

BACKGROUND OF THE INVENTION

Recommender systems have witnessed impressive gains in terms of research methodology and practical success in the past few years (e.g., Amazon and Netflix services). One of the most popular recommendation strategies is collaborative filtering (CF), also known as user-based strategy, which relies on an intuitive observation: users who liked similar items in the past, are likely to agree in the future as well. Given a user, the CF strategy recommends new items which are popular among the set of users who are similar to a given user.

The results returned by recommender systems can, however, suffer from over-specialization, which is to say, the items returned by a recommender system are often similar, or identical, to those previously rated by the user, and while relevant, may be uninteresting. This problem is primarily caused by the fact that recommendation systems focus on maximizing the expected rating, i.e., relevance, of recommended items, while ignoring the novelty aspect, i.e. items that might be more interesting for the user to discover.

SUMMARY OF THE INVENTION

In one embodiment, the invention is a method. Item ratings are received, over a network, from a plurality of users, wherein each rating relates to one of a plurality of items. Each of the plurality of items are assigned, using at least one computing device, to at least one of a plurality data regions. At least one source region for each of the plurality of data regions is identified using the computing device.

A region potential interest score is determined, using the at least one computing device, for a selected user, for each of the plurality of data regions. The region potential interest score increases as the number of items assigned to the respective data region rated by the selected user decreases, and also increases as the number of items assigned to the respective data region rated by a user network decreases. The user network comprises a subset of the plurality of users related to the selected user by at least one relationship criteria.

A user similarity score is then determined, using the computing device, for the selected user, for each one of the plurality of regions, for each one of the plurality of users. The user similarity score is computed by comparing item ratings transmitted by the selected user and the each respective one of the plurality of users for each of the plurality of items assigned to each of the at least one source regions assigned to the respective one of the plurality of data regions.

A regional relevance score is then determined, using the computing device, for the selected user, for each one of the plurality of regions, for each of the plurality of items assigned to the respective data region. The regional relevance score is computed using the user similarity score for each of the plurality of users that rated the respective item and the ratings transmitted by the respective user. An overall relevance score is then determined, using the computing device, for the selected user, for each of the plurality of items, using the regional relevance scores and the region potential interest scores for respective items.

A list of recommended items selecting, using the computing device, for the selected user. The list of recommended items comprises at least one reference to at least one item having a positive overall relevance score. The list of recommended items is then transmitted, over the network, to the selected user.

In another embodiment, the invention is a system. The system comprises a number of modules. Each of the modules comprises one or more processors programmed to execute software code retrieved from a computer readable storage medium storing software for various functions. The modules include: a rating receiving module for receiving, over a network, item ratings from a plurality of users, wherein each rating relates to one of a plurality of items; a data region assignment module for assigning each of the plurality of items to at least one of a plurality data regions; a source region identification module for identifying at least one source region for each of the plurality of data regions; a data region potential interest determination module for determining, for selected users from the plurality of users, a region potential interest score for each of the plurality of data regions, wherein the region potential interest score increases as the number of the plurality of items assigned to the respective data region rated by the selected user decreases, and wherein the region potential interest score additionally increases as the number of the plurality of items assigned to the respective data region rated by a user network decreases, wherein the user network comprises a subset of the plurality of users related to the selected user by at least one relationship criteria; a user similarity determination module; for determining, for the selected user, for each one of the plurality of regions, a user similarity score for each one of the plurality of users, wherein the user similarity score is computed by comparing item ratings transmitted by the selected user and the each respective one of the plurality of users for each of the plurality of items assigned to each of the at least one source regions assigned to the respective one of the plurality of data regions; a regional relevance score determination module for determining for the selected user, for each one of the plurality of regions, a regional relevance score for each of the plurality of items assigned to the respective data region, wherein the regional relevance score is computed using the user similarity score for each of the plurality of users that rated the respective item and the ratings transmitted by the respective user; an overall relevance score determination module for determining, for the selected user, for each of the plurality of items, an overall relevance score using the regional relevance scores and the region potential interest scores for the respective items; a recommendation selection module for selecting, for the selected user, a list of recommended items, wherein the list of recommended items comprises at least one reference to at least one item having a positive overall relevance score; and a recommendation list transmission module for transmitting, over the network, the list of recommended items to the selected user.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
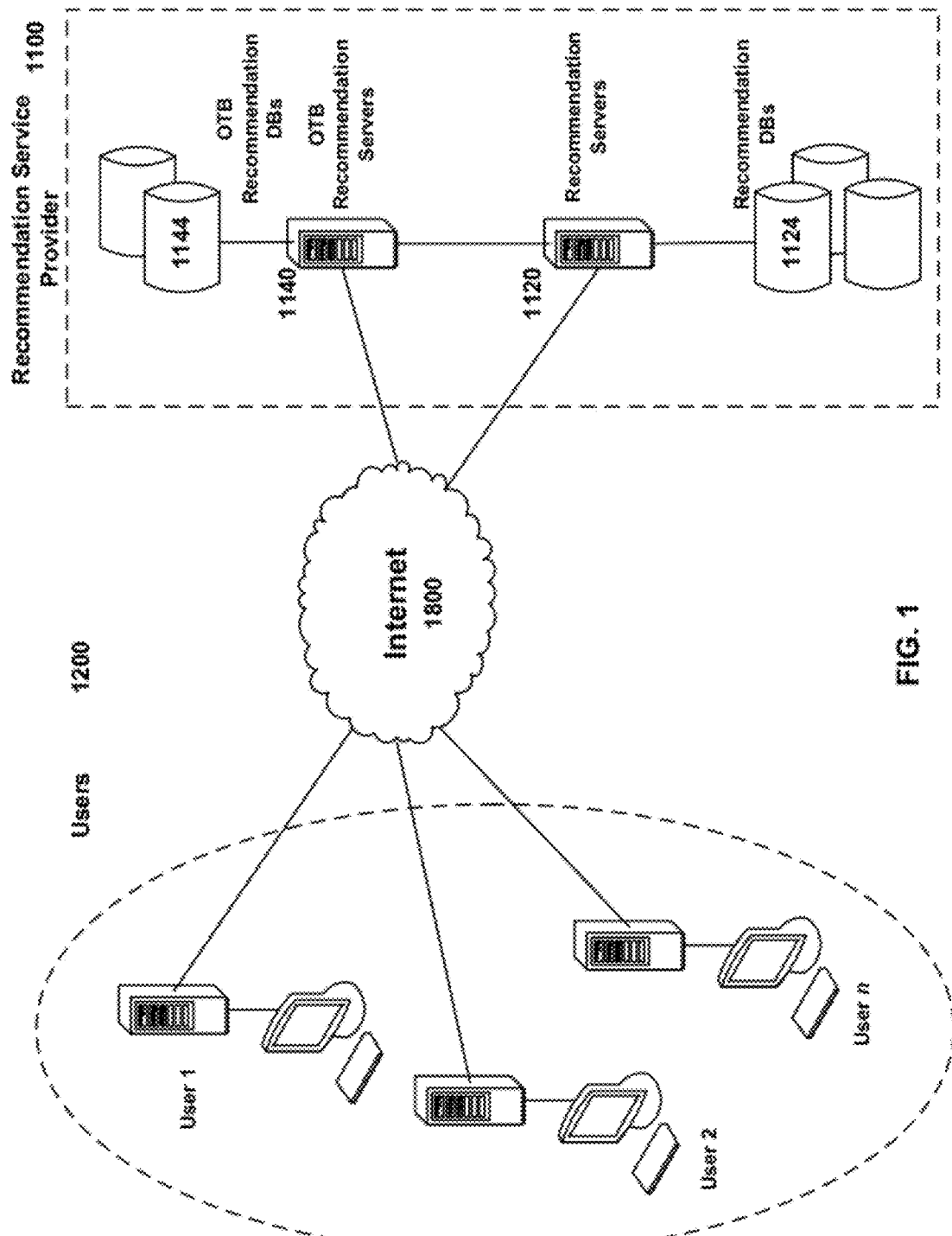
FIG. 1 illustrates one embodiment of an overall system configuration capable of supporting the systems and methods disclosed herein

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure, a computer readable medium stores computer data in machine readable form. By way of example, and not limitation, a computer readable medium can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other mass storage devices, or any other medium which can be used to store the desired information and which can be accessed by the computer.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may grouped into an engine or an application.

For the purposes of this disclosure the term "end user" or "user" should be understood to refer to a consumer of data supplied by a data provider or services provided by a service provider. By way of example, and not limitation, the term "end user" can refer to a person who receives data provided by a data provider over the Internet in a browser session, or can refer to an automated software application which receives the data and stores or processes the data. By way of example, and not limitation, the term "end user" can additionally or alternatively refer to a person who uses a service provided by a service provider over the Internet in a browser session, such as, for example, a recommendation system.

For the purposes of this disclosure the term "recommendation system" or "recommender system" should be understood to refer to systems that provide recommendations to users of such systems. The term "recommendation" should be understood to refer to data relating to a specific subject that the system has determined may be of interest to a user. Such subjects can encompass user interests, hobbies, avocations, professional or personal interests. Examples could include movies, restaurants, travel and so forth. Data relating to a specific subject could include one or more items, for example, in the case of movies, descriptions, summaries or reviews of one or more movies.

Such recommender systems commonly allow users to register with the system and to enter reviews or ratings of specific items. For example, a user might rate one or more movies on a given day, and rate a new restaurant every week or so. The recommender system may additionally be aware of user's social networks, or may identify other users similar to the user in terms of interest or user profiles. The system may recommend items, at least in part, based on ratings provided by such related users.

The present invention is directed to systems and methods for enhancing recommender systems to provide unexpected, but relevant (e.g. "Outside of the Box") recommendations. Recommendation systems commonly use collaborative filtering strategies (CF), also known as user-based strategies, to make recommendations. CF strategies rely on an intuitive observation: users who liked similar items in the past are likely to agree in the future as well. This approach produces items that are likely to be relevant to the user, but may also be the least useful recommendations, delivering items that the user already knows about.

In one embodiment, items known to a recommendation system can be defined as belonging to one or more regions, which can be defined based on intrinsic attributes of the items (e.g., the genre of a movie) and/or user behaviors (e.g., movies liked by the same group of users). Over-specialization can occur when the recommended items for a user overwhelmingly fall into the regions with which the user is already familiar. For example, recommending the movie "X-Men Origins: Wolverine" to a user who has watched and highly rated many Sci-Fi action/thriller movies is, although highly relevant, less useful, since the user is likely to be familiar with this movie. Recommendations coming from regions which the user is less familiar with may be of greater interest.

One measurement of a user's familiarity with a region can be defined as "stickiness". For example, in the case of movies, a user's stickiness to a region is the fraction of movies that a user has rated that fall into that region. Network stickiness and global stickiness can be defined as the average stickiness of a group of users and the entire user population, respectively. A user may be familiar with a region if the user's stickiness for the region exceeds the global stickiness for that same region. For a given user, unfamiliarity with a region (i.e., smaller stickiness than the global population) can arise due to two main reasons. The first possibility is that the user has no interest in the items in that region and therefore chooses not to rate them.

The second possibility is that the user has not been exposed to the region and therefore has limited knowledge of items within the region, some of which may be of great interest. Such regions can be identified, at least within a reasonable degree of certainty, by comparing the user's stickiness for the region against the user's social network stickiness for that region. The user's network is formed by other people who are connected to the user (either explicitly as in friendships within formal social networks or implicitly as in shared behavior). If the user's network is also not familiar with a region, the user may be being under-exposed to that region.

Thus, recommendations from such regions may be "Out-of-the-Box" (OTB) for a user, but may be potentially interesting or useful. OTB recommendation takes some risk by sacrificing the overall relevance of individual recommendations, but compensates the potential loss in relevance with the fact that it is able to find surprisingly good items that may not be obtained otherwise.

Determining the relevance of items within such regions is challenging, since neither the user nor the user's networks have significant experience with the region. For example, assume a system identifies French restaurants as a potentially interesting region for a user (e.g. by estimating that the region is out of the box for the user). The user's social network may be useless in estimating the expected ratings of French restaurants (e.g., in the case where that network contains users who mostly like Chinese and Indian cuisines).

The relevance of OTB recommendations can be enhanced by using an expanded region network, thereby potentially using a different network per region to estimate the expected rating of each item. For example, in the example cited above, if it is determined that French restaurants are correlated with Mediterranean ones, the network built by computing similarities between the user and users who like Mediterranean cuisine will likely be more helpful in computing the relevance of French restaurants for the user.

Regionalization of Data

In one embodiment, regions can be defined for users on social content sites such as Yahoo! Movies, where a set of users (U) shares and rates a set of items (I). In one embodiment one or more databases for storing data on social content sites can be defined which comprise three data structures.

user $\langle$uid, $p_1$, $p_2$, ... $\rangle$: stores the set of users identified by the user id (uid) and their properties ($p_i$);

item $\langle$iid, $a_1$, $a_2$, ... $\rangle$: stores the set of items identified by the item id (iid) and their attributes ($a_1$);

action $\langle$uid, iid, rating, tags, ... $\rangle$: stores the user actions on the items, including rating, tags, etc.

Consider an example social content site about movies (e.g., Yahoo! Movies). Items, i.e., movies, are described by attributes such as title, genres, directors, actors, and so forth. Users are described by their demographic properties such as age and income. A region represents a group of items that are similar with each other. There are at least two ways of defining similarity: attribute based similarity and activity-based similarity.

Attribute based similarity can be defined as follows:

Let A be a set of item attributes, called region dimensions. Then we can define an attribute based similarity function $d_A$. For any two items i and j the distance $d_A(i,j)=0$ if $\forall a \in A$ we have i.a.=j.a, and $d_A(i,j)=\infty$ otherwise.

Given a set of region dimensions A, clustering with the above similarity function will produce a regionization where all items within the region share the same values on the attributes A. The set of region dimensions A is typically application-specific, and can be any subset of the set of all item attributes. For example, on movie sites, region dimensions can include the genre of the movie, names of actors, directors, or a combination of multiple attributes. For attributes with a large number of distinct values (e.g., actors), a taxonomy can be introduced to reduce the total number of regions. For example, Jim Carrey and Adam Sandler can be considered as the same under the notion of "comedian actors."

A region instance can be identified by its dimensions and the values for those dimensions. For example, the region {(genre=comedy), (producer=Disney)} defines the group of Disney produced comedies. One could also define more sophisticated distance functions, e.g., a weighted combination of distances on item attributes.

Activity based similarity may be defined as follows:

For any two items i and j, and action a let a(i) and a(j) define the respective sets of users that performed action a on the item. Then let d(i,j) be the Jaccard dissimilarity between a(i) and a(j):

$$d(i, j) = 1 - \frac{|a(i) \cap a(j)|}{|a(i) \cup a(j)|}$$

In this definition, two items are likely to be in the same region if the set of users that performed the particular action (e.g. rate the movie highly) has a high overlap. The regions produced by clustering under this distance function are necessarily data-dependent. Such an approach does not identify clusters using item attributes ahead of time, but rather learns which items tend to elicit the same action from users.

To produce an assignment of items to regions given a distance function, the k-means++ algorithm can be used. The k-means++ algorithm converges quickly, and for clustering n items requires only O(nkr) distance computations, where k is the number of clusters and r is the number of rounds performed by k-means.

The k-means++ algorithm was initially designed to work on Euclidean metrics. To adapt it to work under Jaccard dissimilarity, an easy two approximation can given by iterating through all of the members of the cluster and choosing the best one. The k-means++ converges to a locally optimum solution after this modification.

Going "Outside the Box"

The goal of making recommendations outside the box is to identify items that (1) the user is not familiar with and (2) are worth recommendation. This can be accomplished by measuring a user's familiarity of a region with the notion of "Outside the Box"-ness ("OTB-ness") to uncover regions with a higher chance to contain unexpected recommendations for the user. In one embodiment, region-based recommendation mechanisms can be used to identify relevant items within OTB regions, which can then be consolidated in an overall recommendation list.

The first concept that can be useful in determining OTB-ness is "stickiness". Basic notations could be defined as follows:

Let u denotes a user and r denotes a region:

items(u) is the set of items that are rated by u; items(r) is the set of items belong to region r;

items(u, r) is the set of items belong to region r that are rated by u, items(u, r)=items(u)∩items(r).

rating(u, i) is the known rating of user u for item i.

The stickiness of a user u to a region r could be defined as follows:

The stickiness of a user u to a region r, stick(u, r) is the fraction between the number of items rated by u which belong to r over the total number of items rated by u, thus $$\text{stick}(u, r) = \frac{\text{items}(u, r)}{\text{items}(u)}$$

Thus, a user who rated 500 movies, 50 of which are Drama, would have a stickiness of 10% for the region {(genre=Drama)}. Stickiness measures the degree of familiarity of a user toward a given region. The higher the stickiness, the more likely the user already knows about items within the region. If the given region is the entire set of items (I), then stick(u, I)=1 for any user u.

Similarly, the stickiness of a group of users to a region can be measured as follows. The stickiness of a group of users (i.e., a network) N to a region r, stick(N, r) is the average of each individual member's stickiness. Hence:

$$\text{stick}(N, r) = \frac{1}{|N|} \sum_{u \in N} (\text{stick}(u, r)).$$

Furthermore, the deviation of stickiness could be defined as follows:

$$\text{stickDev}(N, r) = \sqrt{\frac{1}{|N|} \sum_{u \in N} (\text{stick}(u, r) - \text{stick}(N, r))^2}.$$

The network stickiness measures the familiarity toward the given region by a group of users collectively. The deviation of stickiness measures how consistent each member's stickiness is with the others. The lower the deviation, the more likely every member in the group is familiar (or unfamiliar) with items in the given region. When N is the entire group of users (U), we have the global stickiness, stick(U, r), and deviation of stickiness, stickDev(U, r), for the region.

Modeling Region OTB-ness

Two factors that can be used in measuring a region's OTB-ness for a given user: first, the level of unfamiliarity; second, the (under-)exposure potential. The level of unfamiliarity can be computed by comparing the region's user stickiness with the global stickiness to the region, i.e., the average stickiness of all users.

The base unfamiliarity for a region r by a given user u can be defined as:

$$\text{otbBase}(u, r) = \frac{\text{stick}(U, r) - \text{stick}(u, r)}{\text{stickDev}(U, r)}$$

if stick(U, r)>stick(u, r), 0 otherwise.

The otbBase of a region to 0 if the user is more familiar with that region than the global population. Normalization is performed by the global deviation to identify the regions whose unfamiliarity are the most statistically significant Simply because a region has not been rated by a user frequently does not automatically qualify that region as outside the box. This unfamiliarity can be attributed to two scenarios. First, the user is truly not interested in items in the region and therefore, rates items in that region less frequently. Second, the user is being under-exposed to items in the region, i.e., she has not had many chances to encounter items in the region and is therefore truly unfamiliar with the region.

From OTB recommendation perspective, the latter region is an appropriate place to look for OTB recommendations. Such under-exposure potential can be measured by comparing the region's stickiness of the user's network with that of the global population, where the user's network can be defined either explicitly (e.g., her friends) or implicitly (e.g., other users who share similar behavior with her).

The exposure factor for a region r by a given user u can be defined as:

$$\text{otbFactor}(u, r) = \frac{\text{stick}(U, r) - \text{stick}(N, r)}{\text{stickDev}(U, r) - \text{stickDev}(N, r)} \times 2$$

If stick(U, r)>stick(N, r), 0 otherwise, and N is u's network.

Thus, a region has a high OTB factor if the user's network is also unfamiliar with items in the region. The assumption we make here is that a user's exposure to a region is proportional to the familiarity of the user's network to that region. Therefore, a user is more likely not be interested in items in a region if user's network rates it often while the user does not. Such a region will have a low or zero otbFactor.

Conversely, if the user's network is also not familiar with the region, then it is more likely that the user has not been exposed to many items in the region. Such a region will have a high otbFactor and receives high priority in an OTB recommendation system. Finally, although item ratings indicate whether a user likes an item or not, they usually cannot tell much about whether a user is interested or not in a region in real world. That's because users typically don't bother with rating items in regions that they are not interested in.

Hence the OTB-ness for a region r by a given user u can be defined as:

$$\text{otb}(u,r) = \text{otbBase}(u,r) \times \text{otbFactor}(u,r)$$

Region-Based Relevance Computation

The relevance of an item rating for items in the region can be expressed as relevance(u, i). A collaborative filtering (CF) strategy, can leverage users who share similar interests or have declared relationship with the target user. The key is to find other users connected to the target user. In CF, the rating of an item i by the target user u is typically estimated as follows:

$$\text{relevance}(u,i) = \sum_{u' \in U} \text{userSim}(u,u') \times \text{rating}(u',i)$$

Here, userSim(u, u') returns a measure of similarity or connectivity between two users u and u' (it is 0 if u and u' are not connected). Relevance(u, i) is used to denote the expected rating of i by u as opposed to the known rating of an item by a user (rating(u', i)). As used below, the term "relevance" should be understood to refer to the expected rating.

There are two kinds of user networks on social content sites: explicit and implicit. An example of explicit networks is the friendship network on the del.icio.us networking website, where users become friends by explicit declaration. Such connections are infrequent. For example, a recent snapshot of the del.icio.us networking website shows that only about 10% of the users have at least one explicit friend and about 1% of the users have at least five explicit friends. This means that if the recommendations are based solely on friendship networks, 90% of the users will not be recommended any result.

As a result, many systems leverage implicit networks based on common tagging and rating behavior as identified by the items users share in common (e.g., URLs in del.icio.us networking website or movies in Yahoo! Movies).

In one embodiment, item-based user similarities can be computed as follows:

$$userSim(u, u') = \frac{|items(u, u') \cap items(u')|}{|items(u, u') \cup items(u')|}$$

which is the Jaccard similarity coefficient between items rated by u and items rated by u'.

In one embodiment, rating-based user similarities can be computed as follows:

$$userSim(u, u') = \frac{|\{i \mid i \in items(u) \wedge i \in items(u') \wedge |rating(u, i) - rating(u', i)| \leq 2\}|}{|\{i \mid i \in items(u) \vee i \in items(u')|}$$

which is a Jaccard distance between items rated similarly (within a rating distance of 2 on a 0-5 scale) by two users.

The similarity network can be defined as:

network(u)={u'|userSim(u,u')≥θ} where θ is an application dependant threshold.

We can now write, the relevance of an item for a user in CF, relevance(u, i), can then be written, as follows:

relevance(u,i)=Σ$_{\in network(u)}$userSim(u,u')×rating(u',i)

Expanded Region Networks for "Out of the Box" Recommendations

Identifying good items within OTB regions is a challenge, since neither the user nor the user's overall network knows much about items in those regions. As a result, computing the user's expected rating, i.e., relevance, for items within those regions requires special attention. Region-region correlation can be used to identify the set of regions that implies those OTB regions. An expanded region network, which consists of users who are similar to the target user based on items in those correlated regions can then be constructed.

Association rules can be used to identify region-region correlations. Given the set of regions in $R^I$, let D={$t_1$, $t_2$, ..., $t_m$} be a set of transactions called the database. Each transaction in D has a unique transaction identifier and contains a subset of the regions in $R^I$. In one embodiment, each user forms a transaction that comprises the set of regions in which the user has rated at least one item. The goal is to generate rules of the form r=>r', where r and r' are different regions in $R^I$. Such rules may be referred to as region-region correlations. In order to find them, association rules are required to satisfy an application-dependent minimum support and confidence.

First, minimum support is applied to find all frequent itemsets in a database. In a second step, these frequent itemsets and the minimum confidence constraints are used to form rules. The support supp(r) of a region r is simply the proportion of transactions in the data set which contain r. The confidence of two regions r and r' can be defined as:

conf(r=>r')=supp(r∪r')/supp(r).

A source region can be defined as follows: a region s is a source region of a region r if and only if it satisfies are the set of all regions which satisfy the association rule s=>r. We use sources(r), to denote the set of all source regions of a region r. Examples of source regions in a movie database could be as follows:

TABLE 1

Source Regions in a Movie Database

| Region | Source Region |
|---|---|
| Action | Adventure, Comedy, Crime, Drama, Mystery, Thriller, War |
| Adventure | Crime, Drama, Horror, Mystery, Sci-fi |
| Animation | Children, Comedy, Sci-fi |
| Children | Comedy, Documentary, Drama, Fantasy, Romance |
| Comedy | Crime, Drama, Fantasy, Romance |
| Crime | Documentary, Drama, Thriller, War |
| Documentary | Drama |
| Drama | Action, Comedy, Romance, Sci-fi, Thriller |
| Fantasy | Sci-fi, Thriller |
| Noir | Drama |
| Horror | Adventure, Thriller |
| Imax | Animation |
| Musical | Romance |
| Mystery | Thriller |
| Romance | Drama, Thriller, War |
| Sci-fi | Documentary, War |
| Thriller | War |
| War | Adventure, Western |
| Western | Drama, Action |

Source regions can indicate general trends such as, or example people who rate Woody Allen movies also rate David Lynch movies or people who like South Indian cuisine tend to like Cajun cuisine.

The expanded similarity of two users, exSim(u, u', r), given a region can be defined as follows:

exSim(u,u',r)=max$_{r'\in sources(r)}$userSim(u,u',r)

where userSim(u, u', r) is a similarity between two users restricted to region r.

A ratings based similarity can be adapted as follows:

$$userSim(u, u', r) = \frac{|\{i \mid i \in items(u, r) \wedge i \in items(u', r) \wedge |rating(u, i) - rating(u', i)| \leq 2\}|}{|\{i \mid i \in items(u, r) \vee i \in items(u', r)|}$$

An expanded region network, exNetwork(u, r), for a user u and a region r can then be defined as the set of users u' such that:

$$u' \in U | \text{exSim}(u, u', r) \geq \theta$$

where θ is an application-dependent threshold.

Thus, exNetwork(u, r) is the set formed by users who share similar interests with u over source regions of r.

The relevance of an item in a region, relevance(u, r, i), can then be defined as follows:

$$\text{relevance}(u, r, i) = \Sigma_{u' \in \text{exNetwork}(u, r)} \text{exSim}(u, u', r) \times \text{rating}(u', i)$$

Consolidation

Given a user u, the final goal is to combine the relevance of an item for a user and the "Out of the Box"-ness of the regions the item belongs to in order to present the user with one totally ordered list of (top-k) items. Since an item potentially has a different relevance score for each (user, region) pair, the relevance score of an item needs to be aggregated across the regions to which it belongs.

The overall score of an item i can be defined as follows:

$$\text{overall}(u, i) := \Sigma_{r \in \text{regions}(i)} \text{otb}(u, r) \times \text{relevance}(u, r, i)$$

where regions(i) is the set of all regions an item belongs to, obt(u, r) denotes the OTB score of region r for user u and relevance(u, r, i) is the region-specific relevance score of item i for user u.

In order to efficiently generate the top-k items, those regions r with otb(u, r)>0 are determined, i.e., regions with non-zero OTB-ness for user u. Furthermore, for each such region r, a list of items is created from r sorted in decreasing order of relevance. Given this information, the top-k items can be generated by a simple adaptation to a standard algorithm such as NRA or TA. The two required changes are: the score of an item from a list corresponding to region r should be weighted by the OTB-ness of the region the list corresponds to and, an item's score needs to be aggregated across all the regions the item belongs to. The algorithm maintains a heap of current candidate items to recommend and stops when the expected overall score cannnot exceed the current kth score in the heap.

An Exemplary Implementation of "Out of the Box" Recommendations

FIG. 1 illustrates one embodiment of a system 1000 capable of supporting at least one embodiment of the systems and methods described herein.

A service provider 1100 provides recommendation services including methods for providing "Outside of the Box" recommendations. Recommendation services are supported by a cluster of recommendation servers 1120. The recommendation services can include conventional web search services such as that currently provided by, for example, Yahoo! and Google. The servers 1120 are operatively connected to storage devices 1124 which can support various databases for supporting recommendation services such as, for example, databases comprising user profiles, items, and user ratings of items.

Services for providing "Outside of the Box" recommendations, such as those described above, are supported by a cluster of servers 1140. The servers 1140 are operatively connected to storage devices 1144 which can support various databases for supporting services for providing "Outside of the Box" recommendations, such as, for example, databases comprising definitions of data regions, definitions of source regions; region-to-region correlations and so forth. Alternatively, conventional and "Outside the Box" recommendation services may be hosted by a single cluster of servers, or could be distributed across multiple servers or server clusters using techniques well known in the art.

Users 1200 can access the recommendation services provided by the service provider 1100, including "Outside of the Box" recommendation services, over a network, for example, the Internet 1800. In one embodiment, the recommendation services provided by the service provider 1100 provides facilities that allow users to enter ratings or reviews of items known to the service and to receive recommendations of items that may be of interest to users.

Figure 2:
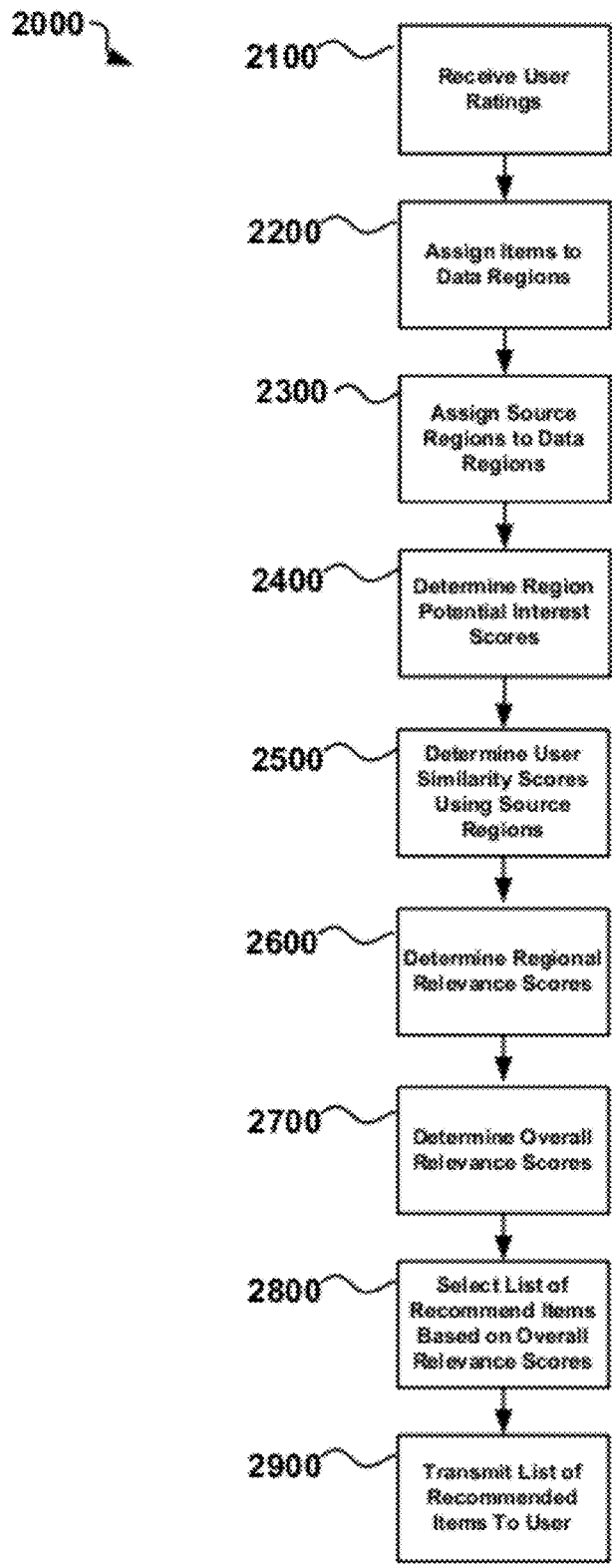
FIG. 2 illustrates one embodiment of a process for "Outside the Box" recommendations in a recommender system.
Figure 3:
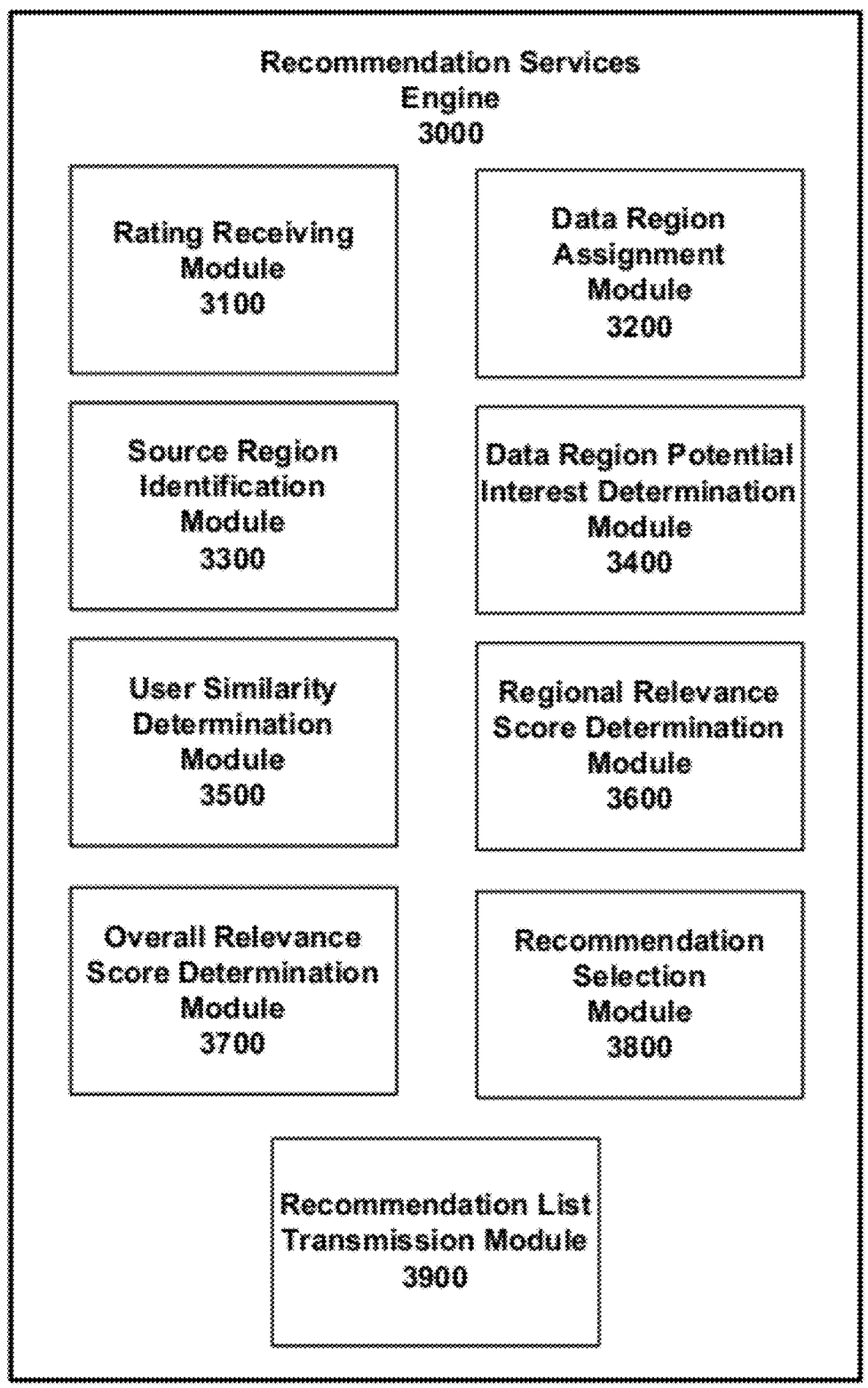
FIG. 3 illustrates one embodiment of a recommendation services engine that that is capable of supporting the process illustrated in FIG. 2.

FIG. 2 illustrates one embodiment of a process 2000 for providing "Outside of the Box" recommendations to users of recommendation systems.

A plurality of item ratings are received 2100, over a network, from a plurality of users, wherein each rating relates to one of a plurality of items. Items for which ratings are received could represent items from one or more categories that a recommendation system supports. For example, a movie recommendation system could allow users to enter ratings for individual movies. Ratings could be coded in any manner known in the art, such as for example, A (good) to F (bad) or 1 (very bad) to 100 (very good). Ratings data could include additional data such as, for example, freeform text comments.

Each of the plurality of items are assigned 2200, using at least one computing device, to at least one of a plurality of data regions. In one embodiment, regions can be defined based on intrinsic attributes of the items defining a set of region dimensions A. The set of region dimensions can be any subset of the set of all item attributes. For example, on movie sites, region dimensions can include the genre of the movie, names of actors, directors, or a combination of multiple attributes. Such intrinsic attributes could be explicitly assigned to items by a system administrator, by a user entering a review or in an automated fashion by a process that mines external data sources for additional item attributes (e.g. in the case of movies, an external movie database, rating service, reviews and commentaries and so forth.

In one embodiment, data regions are defined empirically based on user activity, where two items are likely to be in the same region if the set of users that performed the particular action (e.g. rate the movie highly) has a high overlap. In one embodiment, a Jaccard dissimilarity function can be used to identify clusters of items. In one embodiment, for any two items i and j, and action a, let a(i) and a(j) define the respective sets of users that performed action a on the item (e.g. entered the same rating). Then let d(i,j) be the Jaccard dissimilarity, wherein $$d(i, j) = 1 - \frac{|a(i) \cap a(j)|}{|a(i) \cup a(j)|}$$

Regions can then be defined by clustering all items on Jaccard dissimilarity of item pairs. To produce an assignment of items to regions given such a distance function, the k-means++ algorithm can be used as described above.

At least one source region is identified 2300, using the computing device, for each of the plurality of data regions. A given region s is a source region of some region r if and only if it satisfies the rule s=>r. Source regions could be explicitly defined by, for example, a system administrator. Alternatively, source regions could be identified in an automated fashion by analyzing the data regions to which ratings have been assigned.

In one embodiment, region to region associations can be identified using a support function, supp(r). In one embodiment, the support function, supp(r) of some region r is the proportion of ratings in the plurality of ratings which contain r. The confidence that two regions r and r' are correlated can be defined as:

$$\mathrm{conf}(r \Rightarrow r') = \mathrm{supp}(r \cup r')/\mathrm{supp}(r).$$

In one embodiment, r can be considered a source region of r' if conf(r=>r') falls within a predetermined range, e.g. 1.0 to 1.5.

In one embodiment, the data collected in steps 2100-2300 above can then be used to generate a list of recommended items for one or more users. Such recommendations could be generated periodically, for example, every day. Additionally, or alternatively such recommendations could be generated upon the occurrence of an event such as when the user logs into the recommendation system, or when the user enters a new rating.

In one embodiment, a process for generating a list of recommendations for a user begins by computing a region potential interest score 2400, using the computing device, for the user for each of the plurality of data regions. The region potential interest score represents a metric that indicates that a region contains items to which the user has had limited exposure. The metric factors in both the familiarity of the user with items in the data region and the familiarity of a network of users associated with the user, such as the user's social network as defined on a recommendation system.

In one embodiment, a region potential interest score is determined, using the computing device, for a selected user, for each of the plurality of data regions. The region potential interest score increases as the number of items assigned to the respective data region rated by the selected user decreases, and also increases as the number of items assigned to the respective data region rated by a user network decreases. The user network comprises a subset of the plurality of users related to the selected user by at least one relationship criteria.

Such relationship criteria could be refer to explicitly defined relationships such as, for example, other users of a recommendation system or social networking system a user has defined as friends. Such relationship criteria could be based on user activities, for example, users that have given similar ratings to one or more items.

In one embodiment, the region potential interest score is an otb ("Outside the Box") score computed as follows.

$$\mathrm{otb}(u,r) = \mathrm{otbBase}(u,r) \times \mathrm{otbFactor}(u,r)$$

where
u and r denotes a user and a data region respectively,
otbBase (u, r) is the base unfamiliarity for a region r by a user u, and
otbFactor (u, r) is the exposure factor for a region r by user u,
where $$\mathrm{otbBase}(u, r) = \frac{\mathrm{stick}(U, r) - \mathrm{stick}(u, r)}{\mathrm{stickDev}(U, r)}$$

and $$\mathrm{otbFactor}(u, r) = \frac{\mathrm{stick}(U, r) - \mathrm{stick}(N, r)}{\mathrm{stickDev}(U, r) - \mathrm{stickDev}(N, r)} \times 2$$

where
u and r denotes a user and a data region respectively,
stick (U, r) is the stickiness of all users to a region r
stick (u, r) is the stickiness a user u to a region r
stick (N, r) is the stickiness of a user network N to a region r
stickDev (U, r) is the deviation of stickiness of all users U to a region r
stickDev (N, r) is the deviation of stickiness of a user network N to region r
where $$\mathrm{stick}(u, r) = \frac{\mathrm{items}(u, r)}{\mathrm{items}(u)}$$

where
items(u, r) is the number of items rated by user u which belong to r
items(u) is the number of items rated by user u for all regions
and $$\mathrm{stick}(U, r) = \frac{\mathrm{items}(U, r)}{\mathrm{items}(U)}$$

where
stick(U, r) is the number of items rated by all users U which belong to region r
items(u) is the number of items rated by all users U for all regions
and $$\mathrm{otbBase}(u, r) = \frac{\mathrm{stick}(U, r) - \mathrm{stick}(u, r)}{\mathrm{stickDev}(U, r)}$$

and $$\mathrm{otbFactor}(u, r) = \frac{\mathrm{stick}(U, r) - \mathrm{stick}(N, r)}{\mathrm{stickDev}(U, r) - \mathrm{stickDev}(N, r)} \times 2$$

A user similarity score is then computed 2500, using the computing device, for the selected user, for each one of the plurality of regions, for each one of the plurality of users. The user similarity scores represent the similarity of the user to other individual users in the context of a specific data region. In one embodiment, the user similarity score is computed by comparing item ratings transmitted by the selected user and each respective one of the plurality of users for each of the plurality of items assigned to each of the source regions assigned to the respective one of the plurality of data regions.

In one embodiment, the user similarity scores are expanded similarity scores: exSim(u, u', r), $$\mathrm{exSim}(u,u',r) = \max_{r' \in \mathrm{sources}(r)} \mathrm{userSim}(u,u',r)$$

where
u and u' are two users and r denotes a data region:
sources(r) is the set source regions for data region r, and userSim(u, u', r) is a similarity between two users u and u' restricted to region r, which can be defined as $$\mathrm{userSim}(u, u', r) = \frac{|\{i \mid i \in \mathrm{items}(u, r) \wedge i \in \mathrm{items}(u', r) \wedge |\mathrm{rating}(u, i) - \mathrm{rating}(u', i)| \leq 2\}|}{|\{i \mid i \in \mathrm{items}(u, r) \vee i \in \mathrm{items}(u', r)\}|}$$

where
items(u, r) is the set of items belong to region r that are rated by u,
items(u, r) is the set of items belong to region r that are rated by u',
rating(u, i) is the known rating of user u for item i, and
rating(u', i) is the known rating of user u' for item i.

A regional relevance score is then computed 2600, using the computing device, for the selected user, for each one of the plurality of regions, for each of the plurality of items assigned to the respective data region. In one embodiment, the regional relevance score is computed using the user similarity score for each of the plurality of users that rated the respective item and the ratings transmitted by the respective user.

In one embodiment, a regional relevance score, relevance (u, r, i), can be defined as follows:

$$\text{relevance}(u,r,i) := \Sigma_{u' \in \text{exNetwork}(u,r)} \text{exSim}(u,u',r) \times \text{rating}(u',i)$$

where
u and u' are two users, r is a data region, and i is an item:
exSim(u, u', r) is the expanded similarity score between users u and u'
rating (u', i) is user u' rating for item i
sources(r) is the set source regions for data region r, and
exNetwork(u, r) is the set formed by users who share similar interests with u over source regions of data region r which may be defined as $$u' \in U | \text{exSim}(u,u',r) \geq \theta$$

where θ is an application-dependent threshold.

An overall relevance score is then determined 2700, using the computing device, for the selected user, for each of the plurality of items, using the regional relevance scores and the region potential interest scores for respective items.

The overall relevance of an item i, overall(u, i) may be defined as follows:

$$\text{overall}(u,i) := \Sigma_{r \in \text{regions}(i)} \text{otb}(u,r) \times \text{relevance}(u,r,i)$$

where regions(i) is the set of all regions to which an item belongs, obt(u, r) denotes the "Outside the Box score of region r for user u and relevance(u, r, i) is the region-specific relevance score of item i for user u.

A list of recommended items is then selected 2800 using the computing device. The list of recommended items comprises a reference to at least one item having a positive overall relevance score. A reference to an item represents sufficient information to allow a user to access the item on a recommendation system. Such information could include the item's name, description, and/or a unique token or identifier for the item known to the recommendation system.

In one embodiment, the list of recommended items comprises references to the items containing the top n overall relevance scores, where n is a fixed number, such as 10. In one embodiment, the items are sorted in decreasing order of relevance. The list of recommended items is then transmitted 2900, over the network, to the selected user for display and further interaction at a later point in time.

FIG. 7 illustrates one embodiment of a recommendation services engine 3000 are capable of supporting at least one embodiment of the process described in FIG. 2 above. In one embodiment, the a recommendation services engine 3000 comprises a rating receiving module 3100, a data region assignment module 3200, a source region identification module 3300, a data region potential interest determination module 3400, a user similarity determination module 3500, a regional relevance score determination module 3600, an overall relevance score determination module 3700, a recommendation selection module 3800 and a recommendation list transmission module 3900.

In one embodiment, each of the modules comprises one or more processors programmed to execute software code retrieved from a computer readable storage medium storing software for functions as described below. In one embodiment, each of the modules could be hosted on one or more servers hosted by a service provider, such as the servers 1120 and 1140 shown in FIG. 1. Such an embodiment is purely exemplary, and all of the managers shown could be implemented in any combination on any number servers, as will be readily apparent to those skilled in the art.

In one embodiment, the rating receiving module 3100 is configured to receive, over a network, item ratings from a plurality of users, wherein each rating relates to one of a plurality of items. Items for which ratings are received could represent items from one or more categories that a recommendation system supports. Ratings data could include additional data such as, for example, freeform text comments.

In one embodiment, the data region assignment module 3200 is configured to each of the plurality of items to at least one of a plurality data regions; a source region identification module for identifying at least one source region for each of the plurality of data regions. In one embodiment, regions can be defined based on intrinsic attributes of the items as described above with respect to step 2200 of the process 2000. In one embodiment, data regions are defined empirically based on user activity as described above with respect to step 2200 of the process 2000.

In one embodiment, the source region identification module 3300 is configured to identify at least one source region for each of the plurality of data regions. A given region s is a source region of some region r if and only if it satisfies the rule s=>r. Source regions could be explicitly defined by, for example, a system administrator. Alternatively, source regions could be identified in an automated fashion by analyzing the items to which ratings have been assigned as described above with respect to step 2300 of the process 2000.

In one embodiment, the data region potential interest determination module 3400 is configured to determine, for selected users from the plurality of users, a region potential interest score for each of the plurality of data regions. The region potential interest score increases as the number of the plurality of items assigned to the respective data region rated by the selected user decreases. The region potential interest score additionally increases as the number of the plurality of items assigned to the respective data region rated by a user network decreases. The user network comprises a subset of the plurality of users related to the selected user by at least one relationship criteria In one embodiment, the region potential interest score is an otb ("Outside the Box") score computed as described above with respect to step 2400 of the process 2000.

In one embodiment, the user similarity determination module 3500 is configured to determine for selected users, for each one of the plurality of regions, a user similarity score for each one of the plurality of users. The user similarity score is computed by comparing item ratings transmitted by the selected user and each respective one of the plurality of users for each of the plurality of items assigned to each of the source regions assigned to the respective one of the plurality of data regions In one embodiment, the user similarity scores are expanded similarity scores are computed as described above with respect to step 2500 of the process 2000.

In one embodiment, the regional relevance score determination module 3600 is configured to determine, for the selected users, for each one of the plurality of regions, a regional relevance score for each of the plurality of items assigned to the respective data region. The regional relevance score is computed using the user similarity score for each of the plurality of users that rated the respective item and the ratings transmitted by the respective user. In one embodiment, the regional relevance scores are computed as described above with respect to step 2600 of the process 2000.

In one embodiment, the overall relevance score determination module 3700 is configured to determine an overall relevance score for selected users, for each of the plurality of items, an overall relevance score using the regional relevance scores and the region potential interest scores for the respective items. In one embodiment, the overall relevance scores are computed as described above with respect to step 2700 of the process 2000.

In one embodiment, the recommendation selection module 3800 is configured to select, for selected users, a list of recommended items, wherein the list of recommended items comprises at least one reference to at least one item having a positive overall relevance score.

In one embodiment, the recommendation list transmission module 3900 is configured to transmit, over the network, the list of recommended items to selected users. In one embodiment, the list of recommended items comprises references to the items containing the top n overall relevance scores, where n is a fixed number, such as 10. In one embodiment, the items are sorted in decreasing order of relevance.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A method comprising the steps of:
receiving, over a network, item ratings from a plurality of users, wherein each rating relates to one of a plurality of items;
assigning, using at least one computing device, each of the plurality of items to at least one of a plurality of data regions;
identifying, using the at least one computing device, at least one source region for each of the plurality of data regions;
determining, using the at least one computing device, for a selected one user of the plurality of users, a region potential interest score for each of the plurality of data regions, wherein the region potential interest score increases as the number of the plurality of items assigned to the respective data region rated by the selected user decreases, and wherein the region potential interest score additionally increases as the number of the plurality of items assigned to the respective data region rated by a user network decreases, wherein the user network comprises a subset of the plurality of users related to the selected user by at least one relationship criteria;
determining, using the at least one computing device, for the selected user, for each one of the plurality of regions, a user similarity score for each one of the plurality of users, wherein the user similarity score is computed by comparing item ratings transmitted by the selected user and the each respective one of the plurality of users for each of the plurality of items assigned to each of the at least one source regions assigned to the respective one of the plurality of data regions;
determining, using the at least one computing device, for the selected user, for each one of the plurality of regions, a regional relevance score for each of the plurality of items assigned to the respective data region, wherein the regional relevance score is computed using the user similarity score for each of the plurality of users that rated the respective item and the ratings transmitted by the respective user;
determining, using the at least one computing device, for the selected user, for each of the plurality of items, an overall relevance score using the regional relevance scores and the region potential interest scores for respective items;
selecting, using the at least one computing device, for the selected user, a list of recommended items, wherein the list of recommended items comprises at least one reference to at least one item having a positive overall relevance score; and
transmitting, over the network, the list of recommended items to the selected user.

2. The method of claim 1 wherein each of the plurality of items has at least one intrinsic attribute and each of the plurality of data regions has at least one region dimension, wherein each of the plurality of items is assigned to one or more data regions where the at least one intrinsic attribute of the respective item matches the at least one region dimensions of the respective data region.

3. The method of claim 2 wherein the set of region dimensions for the plurality of data regions comprises a subset of the at least one intrinsic attributes of the plurality of items.

4. The method of claim 1 wherein each of the plurality of items is assigned to one of the plurality of data regions by clustering the plurality of items by at least one action performed by one or more of the plurality of users with respect to the respective item.

5. The method of claim 4 wherein the plurality of items is clustered using a Jaccard dissimilarity function, d(i, j), wherein $$d(i, j) = 1 - \frac{|a(i) \cap a(j)|}{|a(i) \cup a(j)|}$$

where i and j are any two of the plurality of items, a is the at least one action, and a(i) and a(j) define respective sets of the plurality of users that performed action a on the respective item.

6. The method of claim 5 wherein the each of the plurality of items is assigned to one of the plurality of data regions using the Jaccard dissimilarity function, d(i, j), and the k-means++ algorithm.

7. The method of claim 1 wherein the at least one source region for each of the plurality of data regions is identified by a system administrator using an interface provided by the at least one computing device.

8. The method of claim 1 wherein the at least one source region for each of the plurality of data regions is automatically identified by the computing device using a support function, supp(r), where supp(r) is the proportion of ratings in the plurality of ratings which are assigned to one of the plurality of data regions r, wherein $$\mathrm{conf}(r \Rightarrow r') = \mathrm{supp}(r \cup r')/\mathrm{supp}(r)$$

where r and r' are any two of the plurality of data regions and conf(r=>r') is the confidence that two regions r and r' are correlated, wherein r is identified as a source region of r' if conf(r=>r') falls within a predetermined range.

9. The method of claim 1 wherein at least one relationship criteria is a social relationship maintained on a social networking service.

10. The method of claim 1 wherein at least one relationship criteria is a topical interest.

11. The method of claim 1 wherein the region potential interest score is an otb score wherein $$\mathrm{otb}(u,r) = \mathrm{otbBase}(u,r) \times \mathrm{otbFactor}(u,r)$$

where
  u and r denotes one of the plurality of users and one of the plurality of data regions respectively,
  otbBase (u, r) is a base unfamiliarity for data region r by user u, and
  otbFactor (u, r) is an exposure factor for a data region r by user u,
where $$\mathrm{otbBase}(u, r) = \frac{\mathrm{stick}(U, r) - \mathrm{stick}(u, r)}{\mathrm{stickDev}(U, r)}$$

and $$\mathrm{otbFactor}(u, r) = \frac{\mathrm{stick}(U, r) - \mathrm{stick}(N, r)}{\mathrm{stickDev}(U, r) - \mathrm{stickDev}(N, r)} \times 2$$

where
  u and r denotes one of the plurality of users and one of the plurality of data regions respectively,
  stick (U, r) is a stickiness of the plurality of users to data region r
  stick (u, r) is a stickiness a user u to a data region r
  stick (N, r) is a stickiness of a user network N to a region r
  stickDev (U, r) is a deviation of stickiness of all users U to a data region r
  stickDev (N, r) is a deviation of stickiness of the user network for user u, denoted N, to region r
where $$\mathrm{stick}(u, r) = \frac{\mathrm{items}(u, r)}{\mathrm{items}(u)}$$

where
  items(u, r) is a number of the plurality of items rated by user u which belong to data region r
  items(u) is a number of the plurality of items rated by user u for all of the plurality of data regions
and $$\mathrm{stick}(U, r) = \frac{\mathrm{items}(U, r)}{\mathrm{items}(U)}$$

where
  stick(U, r) is a number of the plurality of items rated by all users U which belong to data region r
  items(u) is a number of the plurality of items rated by all users U for all of the plurality of data regions
and $$\mathrm{stick}(N, r) = \frac{1}{|N|} \sum_{u \in N} (\mathrm{stick}(u, r))$$

and $$\mathrm{stickDev}(N, r) = \sqrt{\frac{1}{|N|} \sum_{u \in N} (\mathrm{stick}(u, r) - \mathrm{stick}(N, r))^2}$$

and $$\mathrm{stickDev}(U, r) = \sqrt{\frac{1}{|U|} \sum_{u \in N} (\mathrm{stick}(u, r) - \mathrm{stick}(U, r))^2}.$$

12. A method of claim 11 wherein the user similarity score is an expanded similarity scores, exSim(u, u', r), where $$\mathrm{exSim}(u,u',r) = \max_{r' \in \mathrm{sources}(r)} \mathrm{userSim}(u,u',r')$$

where
  u and u' are two of the plurality of users and r denotes one of the plurality of data regions, and
  sources(r) is the set source regions for data region r, and
where userSim(u, u', r) is a similarity between the two users u and u' restricted to the data region r, where $$\mathrm{userSim}(u, u', r) = \frac{|\{i \mid i \in \mathrm{items}(u, r) \land i \in \mathrm{items}(u', r) \land |\mathrm{rating}(u, i) - \mathrm{rating}(u', i)| \le 2\}|}{|\{i \mid i \in \mathrm{items}(u, r) \lor i \in \mathrm{items}(u', r)\}|}$$

where
- items(u, r) is the set of the plurality of items assigned to data region r that are rated by user u,
- items(u, r) is the set of the plurality of items assigned to data region r that are rated by user u',
- rating(u, i) is a rating by user u for one of the plurality of items i, and
- rating(u', i) is a rating by user u' for one of the plurality of items i.

13. The method of claim 12 wherein the regional relevance score is a relevance score, relevance(u, r, i), wherein $$relevance(u,r,i) = \Sigma_{u' \in exNetwork(u,r)} exSim(u,u',r) \times rating(u',i)$$

where
- u and u' are two of the plurality of users, r is one of the plurality of data regions, and i one of the plurality of items
- exSim(u, u', r) is the expanded similarity score between users u and u'
- rating (u', i) is user u' rating for item i
- sources(r) is the set of source regions for data region r, and
- exNetwork(u, r) is the set formed by users who share similar interests with u over source regions of data region r which may be defined as $$u' \in U | exSim(u,u',r) \geq \theta$$

where θ is an application-dependent threshold.

14. The method of claim 13 wherein the overall relevance score is an overall relevance score, overall(u, i) where $$overall(u,i) := \Sigma_{r \in regions(i)} otb(u,r) \times relevance(u,r,i).$$

15. The method of claim 1 wherein the list of recommended items comprises references to the items having the top n overall relevance scores, where n is a fixed number.

16. A system comprising:
- a rating receiving module comprising one or more processors programmed to execute software code retrieved from a computer readable storage medium storing software for receiving, over a network, item ratings from a plurality of users, wherein each rating relates to one of a plurality of items;
- a data region assignment module comprising one or more processors programmed to execute software code retrieved from a computer readable storage medium storing software for assigning each of the plurality of items to at least one of a plurality data regions;
- a source region identification module comprising one or more processors programmed to execute software code retrieved from a computer readable storage medium storing software for identifying at least one source region for each of the plurality of data regions;
- a data region potential interest determination module comprising one or more processors programmed to execute software code retrieved from a computer readable storage medium storing software for determining, for selected users of the plurality of users, a region potential interest score for each of the plurality of data regions, wherein the region potential interest score increases as the number of the plurality of items assigned to the respective data region rated by the selected user decreases, and wherein the region potential interest score additionally increases as the number of the plurality of items assigned to the respective data region rated by a user network decreases, wherein the user network comprises a subset of the plurality of users related to the selected user by at least one relationship criteria;
- a user similarity determination module comprising one or more processors programmed to execute software code retrieved from a computer readable storage medium storing software for determining, for the selected user, for each one of the plurality of regions, a user similarity score for each one of the plurality of users, wherein the user similarity score is computed by comparing item ratings transmitted by the selected user and the each respective one of the plurality of users for each of the plurality of items assigned to each of the at least one source regions assigned to the respective one of the plurality of data regions;
- a regional relevance score determination module comprising one or more processors programmed to execute software code retrieved from a computer readable storage medium storing software for determining for the selected user, for each one of the plurality of regions, a regional relevance score for each of the plurality of items assigned to the respective data region, wherein the regional relevance score is computed using the user similarity score for each of the plurality of users that rated the respective item and the ratings transmitted by the respective user;
- an overall relevance score determination module comprising one or more processors programmed to execute software code retrieved from a computer readable storage medium storing software for determining, for the selected user, for each of the plurality of items, an overall relevance score using the regional relevance scores and the region potential interest scores for respective items;
- a recommendation selection module comprising one or more processors programmed to execute software code retrieved from a computer readable storage medium storing software for selecting, for the selected user, a list of recommended items, wherein the list of recommended items comprises at least one reference to at least one item having a positive overall relevance score;
- a recommendation list transmission module comprising one or more processors programmed to execute software code retrieved from a computer readable storage medium storing software for transmitting, over the network, the list of recommended items to the selected user.

17. The system of claim 16 wherein each of the plurality of items has at least one intrinsic attribute and each of the plurality of data regions has at least one region dimension, wherein each of the plurality of items is assigned to one or more data regions where the at least one intrinsic attribute of the respective item matches the at least one region dimensions of the respective data region.

18. The system of claim 16 wherein each of the plurality of items is assigned by the data region assignment module to one of the plurality of data regions by clustering the plurality of items by at least one action performed by one or more of the plurality of users with respect to the respective item.

19. The system of claim 18 wherein the plurality of items is clustered by the data region assignment module using a Jaccard dissimilarity function, d(i, j), wherein $$d(i, j) = 1 - \frac{|a(i) \cap a(j)|}{|a(i) \cup a(j)|}$$

where i and j are any two of the plurality of items, a is the at least one action, and a(i) and a(j) define respective sets of the plurality of users that performed action a on the respective item.

20. The system of claim 16 wherein the at least one source region for each of the plurality of data regions is automatically identified by the source region identification module using a support function, supp(r), where supp(r) is the proportion of ratings in the plurality of ratings which are assigned to one of the plurality of data regions r, wherein $$\mathrm{conf}(r \Rightarrow r') = \mathrm{supp}(r \cup r')/\mathrm{supp}(r)$$

where r and r' are any two of the plurality of data regions and conf(r=>r') is the confidence that two regions r and r' are correlated, wherein r is identified as a source region of r' if conf(r=>r') falls within a predetermined range.

21. The system of claim 16 wherein the region potential interest score determined by the data region potential interest determination module is an otb score wherein $$otb(u,r) = otbBase(u,r) \times otbFactor(u,r)$$

where
  u and r denotes one of the plurality of users and one of the plurality of data regions respectively,
  otbBase (u, r) is a base unfamiliarity for data region r by user u, and
  otbFactor (u, r) is an exposure factor for a data region r by user u,
where $$otbBase(u, r) = \frac{\mathrm{stick}(U, r) - \mathrm{stick}(u, r)}{stickDev(U, r)}$$

and $$otbFactor(u, r) = \frac{\mathrm{stick}(U, r) - \mathrm{stick}(N, r)}{stickDev(U, r) - stickDev(N, r)} \times 2$$

where
  u and r denotes one of the plurality of users and one of the plurality of data regions respectively,
  stick (U, r) is a stickiness of the plurality of users to data region r
  stick (u, r) is a stickiness a user u to a data region r
  stick (N, r) is a stickiness of a user network N to a region r
  stickDev (U, r) is a deviation of stickiness of all users U to a data region r
  stickDev (N, r) is a deviation of stickiness of the user network for user u, denoted N, to region r
where $$\mathrm{stick}(u, r) = \frac{\mathrm{items}(u, r)}{\mathrm{items}(u)}$$

where
  items(u, r) is a number of the plurality of items rated by user u which belong to data region r
  items(u) is a number of the plurality of items rated by user u for all of the plurality of data regions and $$\mathrm{stick}(U, r) = \frac{\mathrm{items}(U, r)}{\mathrm{items}(U)}$$

where
  stick(U, r) is a number of the plurality of items rated by all users U which belong to data region r
  items(u) is a number of the plurality of items rated by all users U for all of the plurality of data regions and $$\mathrm{stick}(N, r) = \frac{1}{|N|} \sum_{u \in N} (\mathrm{stick}(u, r))$$

and $$stickDev(N, r) = \sqrt{\frac{1}{|N|} \sum_{u \in N} (\mathrm{stick}(u, r) - \mathrm{stick}(N, r))^2}$$

and $$stickDev(U, r) = \sqrt{\frac{1}{|U|} \sum_{u \in N} (\mathrm{stick}(u, r) - \mathrm{stick}(U, r))^2}.$$

22. The system of claim 21 wherein the user similarity score determined by the user similarity determination module is an expanded similarity score, exSim(u, u', r), where $$\mathrm{exSim}(u,u',r) = \max_{r' \in sources(r)} \mathrm{userSim}(u,u',r)$$

where
  u and u' are two of the plurality of users and r denotes one of the plurality of data regions, and
  sources(r) is the set source regions for data region r, and
where userSim(u, u', r) is a similarity between the two users u and u' restricted to the data region r, where $$\mathrm{userSim}(u, u', r) = \frac{|\{i \mid i \in \mathrm{items}(u, r) \wedge i \in \mathrm{items}(u', r) \wedge |\mathrm{rating}(u, i) - \mathrm{rating}(u', i)| \leq 2\}|}{|\{i \mid i \in \mathrm{items}(u, r) \vee i \in \mathrm{items}(u', r)\}|}$$

where
  items(u, r) is the set of the plurality of items assigned to data region r that are rated by user u,
  items(u, r) is the set of the plurality of items assigned to data region r that are rated by user u',
  rating(u, i) is a rating by user u for one of the plurality of items i, and
  rating(u', i) is a rating by user u' for one of the plurality of items i.

23. The system of claim 22 wherein the regional relevance score determined by the regional relevance score determination module is a relevance score, relevance(u, r, i), wherein $$\mathrm{relevance}(u,r,i) = \Sigma_{u' \in exNetwork(u,r)} \mathrm{exSim}(u,u',r) \times \mathrm{rating}(u',i)$$

where
  u and u' are two of the plurality of users, r is one of the plurality of data regions, and i one of the plurality of items exSim(u, u', r) is the expanded similarity score between users u and u' rating (u', i) is user u' rating for item i sources(r) is the set of source regions for data region r, and exNetwork(u, r) is the set formed by users who share similar interests with u over source regions of data region r which may be defined as $$u \Sigma U | exSim(u,u',r) \geq \theta$$

where θ is an application-dependent threshold.

24. The system of claim 23 wherein the overall relevance score determined by the overall relevance score determination module is an overall relevance score, overall(u, i) where $$overall(u,i) := \Sigma_{r \epsilon regions(i)} otb(u,r) \times relevance(u,r,i).$$

25. A non-transitory computer-readable medium having computer-executable instructions for a method comprising the steps of:

receiving, over a network, item ratings from a plurality of users, wherein each rating relates to one of a plurality of items;

assigning, using at least one computing device, each of the plurality of items to at least one of a plurality data regions;

identifying, using the at least one computing device, at least one source region for each of the plurality of data regions;

determining, using the at least one computing device, for a selected one user of the plurality of users, a region potential interest score for each of the plurality of data regions, wherein the region potential interest score increases as the number of the plurality of items assigned to the respective data region rated by the selected user decreases, and wherein the region potential interest score additionally increases as the number of the plurality of items assigned to the respective data region rated by a user network decreases, wherein the user network comprises a subset of the plurality of users related to the selected user by at least one relationship criteria;

determining, using the at least one computing device, for the selected user, for each one of the plurality of regions, a user similarity score for each one of the plurality of users, wherein the user similarity score is computed by comparing item ratings transmitted by the selected user and the each respective one of the plurality of users for each of the plurality of items assigned to each of the at least one source regions assigned to the respective one of the plurality of data regions;

determining, using the at least one computing device, for the selected user, for each one of the plurality of regions, a regional relevance score for each of the plurality of items assigned to the respective data region, wherein the regional relevance score is computed using the user similarity score for each of the plurality of users that rated the respective item and the ratings transmitted by the respective user;

determining, using the at least one computing device, for the selected user, for each of the plurality of items, an overall relevance score using the regional relevance scores and the region potential interest scores for respective items;

selecting, using the at least one computing device, for the selected user, a list of recommended items, wherein the list of recommended items comprises at least one reference to at least one item having a positive overall relevance score; and transmitting, over the network, the list of recommended items to the selected user.

26. The computer-readable medium of claim 25 wherein each of the plurality of items has at least one intrinsic attribute and each of the plurality of data regions has at least one region dimension, wherein each of the plurality of items is assigned to one or more data regions where the at least one intrinsic attribute of the respective item matches the at least one region dimensions of the respective data region.

27. The computer-readable medium of claim 25 wherein each of the plurality of items is assigned to one of the plurality of data regions by clustering the plurality of items by at least one action performed by one or more of the plurality of users with respect to the respective item.

28. The computer-readable medium of claim 27 wherein the plurality of items is clustered using a Jaccard dissimilarity function, d(i, j), wherein $$d(i, j) = 1 - \frac{|a(i) \cap a(j)|}{|a(i) \cup a(j)|}$$

where i and j are any two of the plurality of items, a is the at least one action, and a(i) and a(j) define respective sets of the plurality of users that performed action a on the respective item.

29. The computer-readable medium of claim 25 wherein the at least one source region for each of the plurality of data regions is automatically identified by the computing device using a support function, supp(r), where supp(r) is the proportion of ratings in the plurality of ratings which are assigned to one of the plurality of data regions r, wherein $$conf(r \Rightarrow r') = supp(r \cup r')/supp(r)$$

where r and r' are any two of the plurality of data regions and conf(r=>r') is the confidence that two regions r and r' are correlated, wherein r is identified as a source region of r' if conf(r=>r') falls within a predetermined range.

30. The computer-readable medium of claim 25 wherein the region potential interest score is an otb score wherein $$otb(u,r) = otbBase(u,r) \times otbFactor(u,r)$$

where u and r denotes one of the plurality of users and one of the plurality of data regions respectively, otbBase (u, r) is a base unfamiliarity for data region r by user u, and otbFactor (u, r) is an exposure factor for a data region r by user u, where $$otbBase(u, r) = \frac{stick(U, r) - stick(u, r)}{stickDev(U, r)}$$

and $$otbFactor(u, r) = \frac{stick(U, r) - stick(N, r)}{stickDev(U, r) - stickDev(N, r)} \times 2$$

where u and r denotes one of the plurality of users and one of the plurality of data regions respectively, stick (U, r) is a stickiness of the plurality of users to data region r stick (u, r) is a stickiness a user u to a data region r stick (N, r) is a stickiness of a user network N to a region r stickDev (U, r) is a deviation of stickiness of all users U to a data region r stickDev (N, r) is a deviation of stickiness of the user network for user u, denoted N, to region r where $$\text{stick}(u, r) = \frac{\text{items}(u, r)}{\text{items}(u)}$$

where
items(u, r) is a number of the plurality of items rated by user u which belong to data region r
items(u) is a number of the plurality of items rated by user u for all of the plurality of data regions
and $$\text{stick}(U, r) = \frac{\text{items}(U, r)}{\text{items}(U)}$$

where
stick(U, r) is a number of the plurality of items rated by all users U which belong to data region r
items(u) is a number of the plurality of items rated by all users U for all of the plurality of data regions
and $$\text{stick}(N, r) = \frac{1}{|N|} \sum_{u \in N} (\text{stick}(u, r))$$

and $$\text{stickDev}(N, r) = \sqrt{\frac{1}{|N|} \sum_{u \in N} (\text{stick}(u, r) - \text{stick}(N, r))^2}$$

and $$\text{stickDev}(U, r) = \sqrt{\frac{1}{|U|} \sum_{u \in N} (\text{stick}(u, r) - \text{stick}(U, r))^2}.$$

31. The computer-readable medium of claim 30 wherein the user similarity score is an expanded similarity scores, exSim(u, u', r), where $$\text{exSim}(u,u',r) = \max_{r' \in \text{sources}(r)} \text{userSim}(u,u',r)$$

where
u and u' are two of the plurality of users and r denotes one of the plurality of data regions, and
sources(r) is the set source regions for data region r, and
where userSim(u, u', r) is a similarity between the two users u and u' restricted to the data region r, where $$\text{userSim}(u, u', r) = \frac{|\{i \mid i \in \text{items}(u, r) \land i \in \text{items}(u', r) \land |\text{rating}(u, i) - \text{rating}(u', i)| \leq 2\}|}{|\{i \mid i \in \text{items}(u, r) \lor i \in \text{items}(u', r)\}|}$$

where
items(u, r) is the set of the plurality of items assigned to data region r that are rated by user u,
items(u, r) is the set of the plurality of items assigned to data region r that are rated by user u',
rating(u, i) is a rating by user u for one of the plurality of items i, and
rating(u', i) is a rating by user u' for one of the plurality of items i.

32. The computer-readable medium of claim 31 wherein the regional relevance score is a relevance score, relevance(u, r, i), wherein $$\text{relevance}(u,r,i) = \Sigma_{u' \in \text{exNetwork}(u,r)} \text{exSim}(u,u',r) \times \text{rating}(u',i)$$

where
u and u' are two of the plurality of users, r is one of the plurality of data regions, and i one of the plurality of items
exSim(u, u', r) is the expanded similarity score between users u and u'
rating (u', i) is user u' rating for item i
sources(r) is the set of source regions for data region r, and
exNetwork(u, r) is the set formed by users who share similar interests with u over source regions of data region r which may be defined as $$u' \in U | \text{exSim}(u,u',r) \geq \theta$$

where θ is an application-dependent threshold.

33. The computer-readable medium of claim 32 wherein the overall relevance score is an overall relevance score, overall(u, i) where $$\text{overall}(u,i) := \Sigma_{r \in \text{regions}(i)} \text{otb}(u,r) \times \text{relevance}(u,r,i).$$

34. The computer-readable medium of claim 25 wherein the list of recommended items comprises references to the items having the top n overall relevance scores, where n is a fixed number.

* * * * *